T 866004

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 2, 1969

866 O.G. 22

665,271
GRANULAR POLYOLEFINS
Richard L. McConnell, P.O. Box 511,
Kingsport, Tenn. 37662
Filed Sept. 5, 1967. Published Sept. 2, 1969
Int. Cl. C08f *47/03*
U.S. Cl. 260—88.2
No Drawing. 14 Pages Specification

A process for preparing granular polyolefin which comprises dissolving poly-α-olefin prepared from at least one α-olefin monomer having at least four carbon atoms in at least one saturated aliphatic alcohol containing 5 to 8 carbon atoms at an elevated temperature and cooling the polyolefin-alcohol mixture to precipitate the polyolefin as a granular product.